United States Patent [19]

Knothe et al.

[11] Patent Number: 4,645,021

[45] Date of Patent: Feb. 24, 1987

[54] ELECTRONIC BALANCE WITH DUAL PURPOSE 10-KEY KEYBOARD

[75] Inventors: Erich Knothe, Eddigehausen; Franz-Josef Melcher, Hardegsen; Christian Oldendorf, Göttingen, all of Fed. Rep. of Germany

[73] Assignee: Sartorius GmbH, Fed. Rep. of Germany

[21] Appl. No.: 819,043

[22] Filed: Jan. 15, 1986

[30] Foreign Application Priority Data

Jan. 18, 1985 [DE] Fed. Rep. of Germany ....... 3501503

[51] Int. Cl.⁴ ..................... G01G 23/14; G01G 19/22
[52] U.S. Cl. ....................................... 177/165; 177/70
[58] Field of Search ................................. 177/70, 165

[56] References Cited

U.S. PATENT DOCUMENTS

| | | | |
|---|---|---|---|
| 3,127,947 | 4/1964 | Vogel | 177/70 |
| 3,262,509 | 7/1966 | Schellentrager | 177/70 X |
| 3,727,706 | 4/1973 | Streater et al. | 177/165 X |
| 4,117,898 | 10/1978 | Moriyama | 177/165 |
| 4,219,089 | 8/1980 | Gard et al. | 177/165 |
| 4,299,299 | 11/1981 | Knothe et al. | 177/165 X |
| 4,390,074 | 6/1983 | Vogel | 177/165 X |

Primary Examiner—George H. Miller, Jr.
Attorney, Agent, or Firm—Eric P. Schellin

[57] ABSTRACT

In order to make it possible to display a consecutive number in a simple manner in an electronic balance having a digital display (10) and a 10-key keyboard (12), the invention provides that a light source (16) be associated with each of the keys of the 10-key keyboard and that the counter for the consecutive number actuates the light source of the 10-key keyboard which corresponds to its counter reading. The counter is actuated by a tare key and other light sources are provided to indicate larger decades.

7 Claims, 3 Drawing Figures

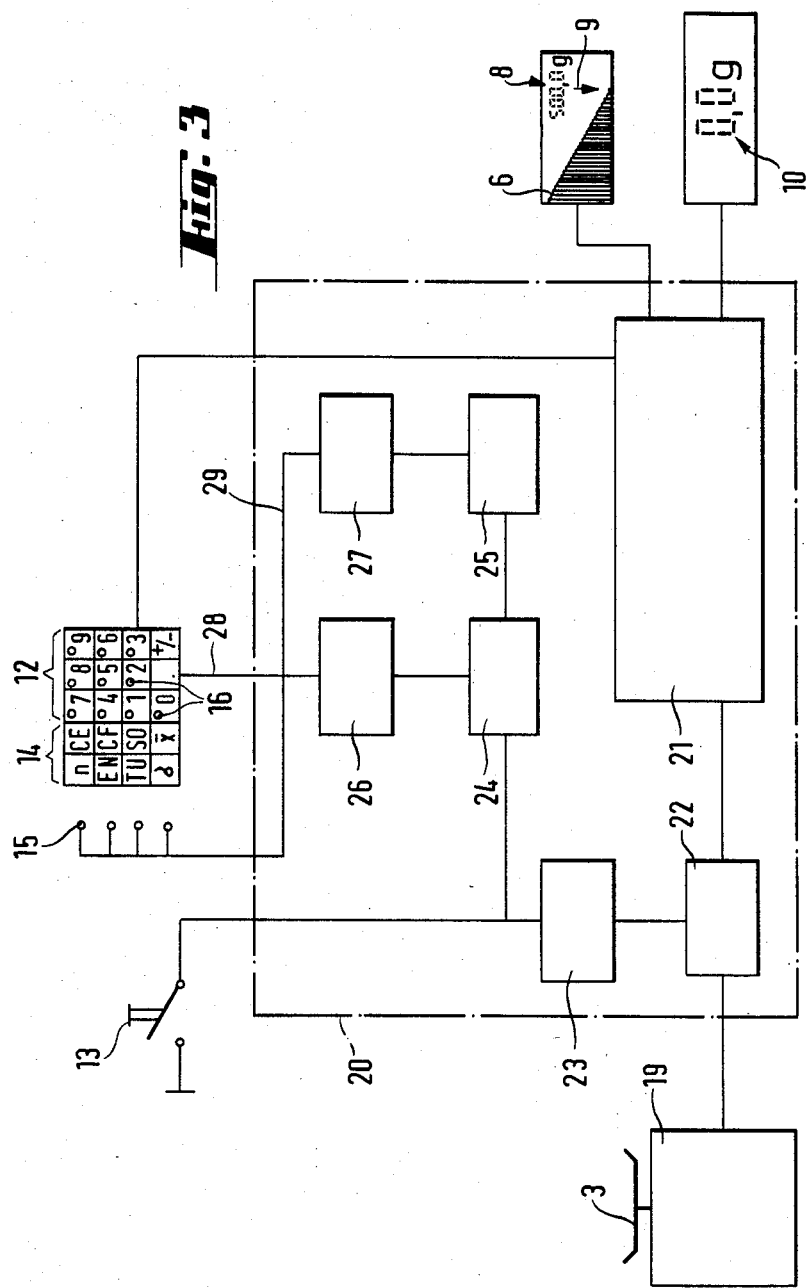

ELECTRONIC BALANCE WITH DUAL PURPOSE 10-KEY KEYBOARD

BACKGROUND OF THE INVENTION

1. Field of the Invention

The invention is related to an electronic balance having a measured value receiver, a digital signal processing unit, a digital display, a tare key, and a 10-key keyboard (with 10 keys) for inputting data and commands. A counter is also provided in said the digital signal processing unit, which is advanced by one each time the tare key, for example, is actuated.

2. Description of the Prior Art

In many applications it is desirable that an electronic balance display a consecutive number in addition to displaying the measured result of the balance. During dosing, for example, the number of the component which is being dosed is of interest; or, during the checking of finished packages for statistical purposes the number of the packages already weighed is of interest. The counter in the digital signal processing unit of the present invention is provided for calculating the consecutive number.

It is known, for example, in order to show the counter's reading, that the number of digits of the digital display can be increased and the consecutive number displayed to the left in front of the measured value display. Or, instead of the weighing result, the consecutive number maybe briefly displayed in the digital display. However, both of these methods, readily cause confusion, because the digital display is intended to normally displays weighing results. The provision of an additional display for this consecutive number is also known, e.g. in the form of a two-line LCD display, as is described in DE-OS No. 34 04 926. However, this makes the display elements considerably more expensive.

Moreover, CH No. 422,367 teaches the construction of several adjacent linear 10-key keyboards as luminous keyboards which are used to display the measured value. These keyboards are not displaying an additional numeric value but rather the displaying of the measured value; correspondingly, at a balance resolution of 10,000 increments four 10-key luminous keyboards with a corresponding place requirement are necessary.

SUMMARY OF THE INVENTION

The invention has the objective of creating an inexpensive display of the consecutive number which requires no additional space in the operating and reading area of the electronic balance.

The invention achieves this objective as follows: A light source is associated with a least a few keys of the 10 key keyboard and the counter present in the digital signal processing unit actuates the light source of the 10 key keyboard which corresponds to its value.

BRIEF DESCRIPTION OF THE DRAWINGS

The invention is described below with reference made to the figures.

FIG. 3 shows a schematic block diagram of the electronic balance.

DETAILED DESCRIPTION

Figure 1:
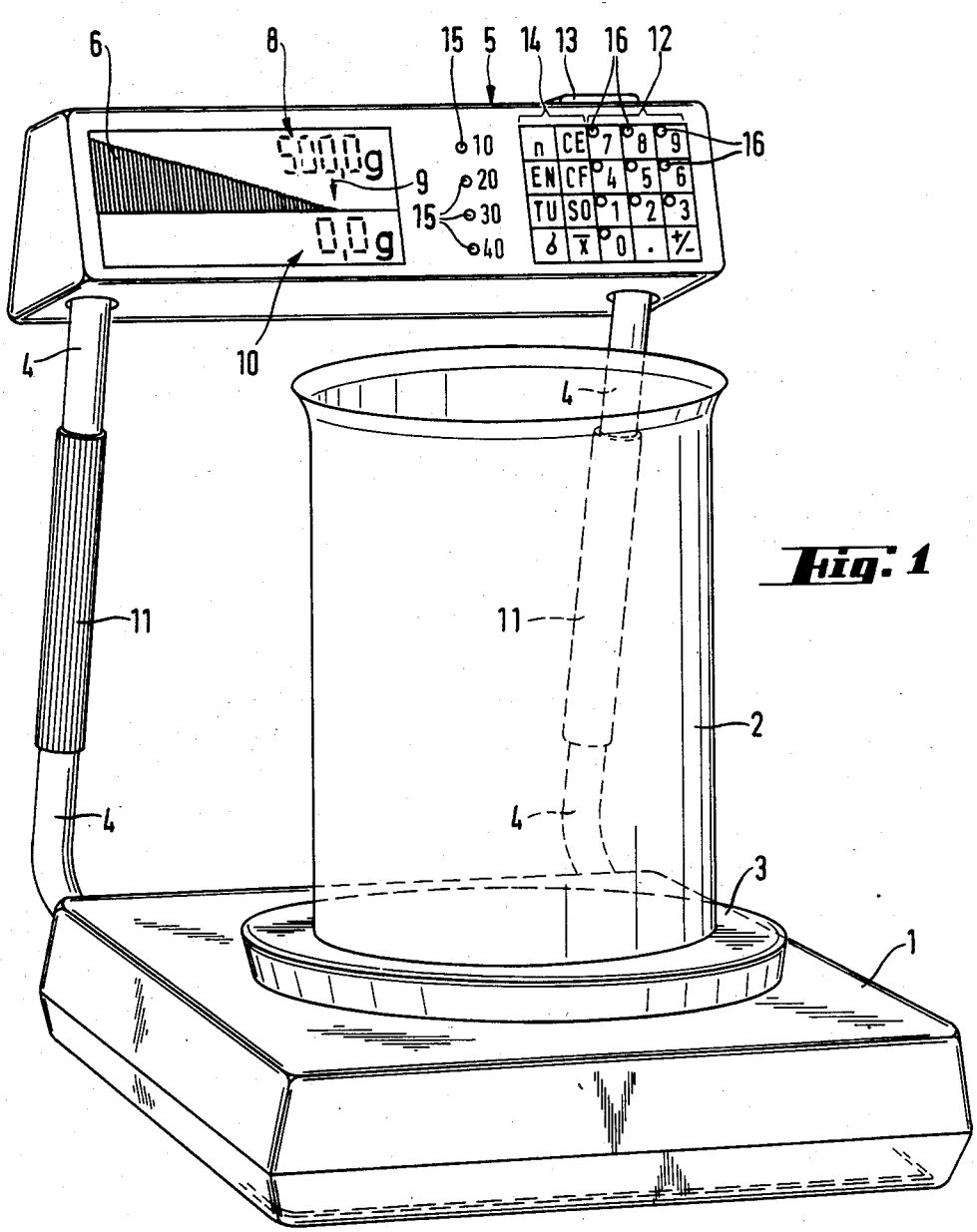
FIG. 1 shows an external view of the electronic balance.

The electronic balance of FIG. 1 consists of bottom part 1 in which the measuring system is housed. Weighing dish 3 is located on top of part 1 and receives the material to be weighed, shown here as glass beaker 2. Display/operating console 5 is connected to part 1 via pieces 4 having hand grips 11. Display/operating console 5 contains analog display 6 in the form of an LCD display, digital display 10, tare key 13 and 10-key keyboard 12 (numbers from 0 to 9) for inputting numeric values. Keyboard 12 is supplemented by several command keys 14. These parts of the electronic balance are generally known and their function therefore do not need to be explained in more detail.

Figure 2:
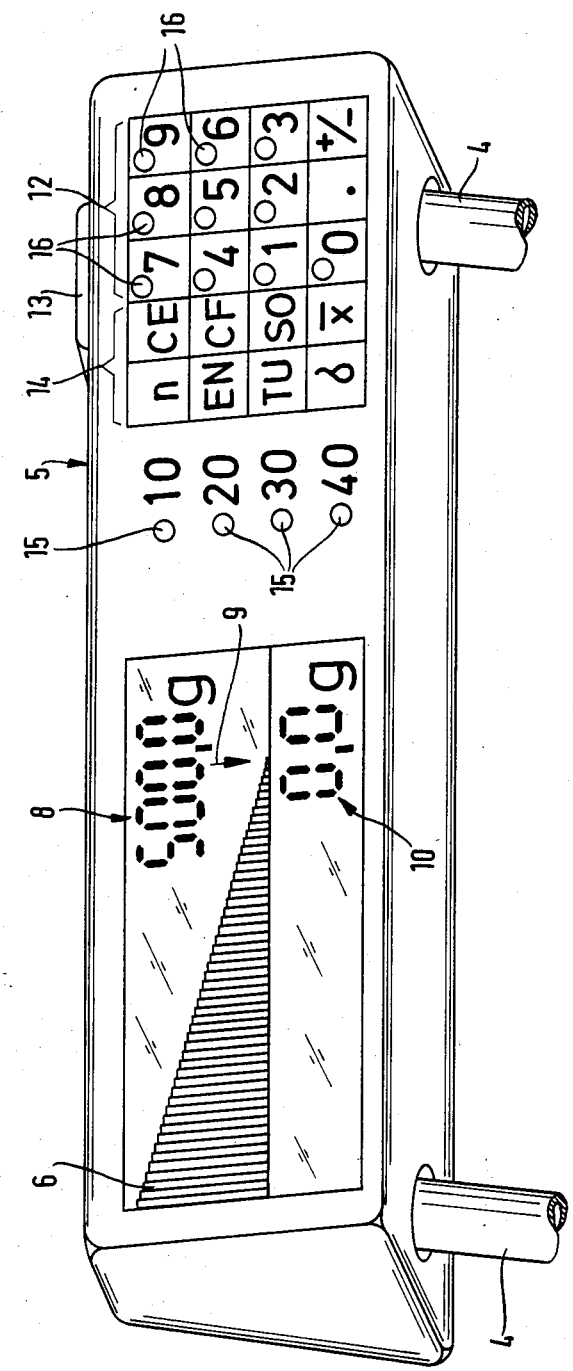
FIG. 2 shows the display/operating console on a somewhat larger scale.

Moreover, display/operating console 5, shown in FIG. 1, and on a somewhat enlarged scale in FIG. 2, comprise light sources 16, each of which is associated with a key of 10-key keyboard 12. These light sources 16 are advantageously formed by light-emitting diodes which are located, as shown, in a corner of each particular key. This leaves enough space for printing on the number value of the key and for the switching mechanism of the particular key. In addition, because of this structure, the keys do not need to be transparent over the entire surface.

Display/operating console 5 comprises other light-emitting diodes 15 adjacent to the key-board which are designated with consecutive decades "10", "20", "30" and "40". While only the numbers 1 to 9 can be represented with light-emitting diodes 16 (number 10 maybe represented by the light emitting diode in the "0" key), numbers up to 40 can be represented by combining the information displayed by light emitting diodes 15 and 16. If this should not be sufficient, the representable number range can readily be expanded by adding other light-emitting diodes 15 representing higher consecutive decades; or by coding with non consecutive decades wherein the additive of the decades represented by the lighted diodes corresponds to the intervening unrepresented decades (e.g. light emitting diodes for 10, 20, 40, 80).

The electronic control of light-emitting diodes 16 and 15 can be seen in the block diagram of FIG. 3. The measured value receiver of the electronic balance is indicated only by box 19 having weighing scale 3. It supplies a digital or a digitized weighing result to digital signal processing unit 20. The latter comprises central control unit 21, wherein tare memory 23 and substraction unit 22 are used for calculating the net weighing result and are represented by separate blocks. The control of analog display 6 and digital display 10, as well as the other functions not shown is likewise controlled by central control unit 21. Decimal counter 24 is also shown, which is advanced by one at each actuation of the tare key. The reading of counter 24 is directed to decoder 26, which actuates, in accordance with the counter reading, one of its 10 outputs and therewith the associated light-emitting diode 16. In FIG. 3 these 10 leads are collected into "cable" 28. The overflow of counter 24 passes to a second counter 25, which thus counts the decades and controls light-emitting diodes 15 via decoder 27 in an analogous manner. The entire digital processing unit 20 can of course be a microprocessor.

The use of the additional number will be explained with the example of a dosing:

First, the empty tare vessel is placed on the weighing dish and tared off. Counter 24 jumps to "1" and actuates the light-emitting diode associated with key "1". The user doses in the first component, tares it off, counter 24 jumps to "2" and actuates the light-emitting diode associated with key "2", etc. If the user is now interrupted in his work, he will recognize the number of the component in process when he starts again by which light-emitting diode 16 and possibly which light-emitting diode 15 is illuminated.

The display/operating console 5 shown in FIGS. 1 and 2 makes the dosing even easier by permitting the theoretical value of the particular component to be typed in and by permitting the dosing to be performed by analog display 6 up to 100% and by digital display 10 starting from the negative theoretical value to 0 g. After the taring of the empty vessel by tare key 13, the light-emitting diode associated with key "1" lights up again, the user then puts in the theoretical value of the first component via 10-key keyboard 12 (e.g. 500.0 g). Digital display 10 displays the negative theoretical value (minus 500.0 g), analog display 6 displays 0% and the digital display of the theoretical value appears in additional field 8 above the 100% point of analog display 6. Arrow 9 points from the theoretical value to the 100% point of the analog display. The user now doses in the first component, analog display 6 travels from 0% to 100%, and digital display 10 runs from the negative theoretical value to 0.0 g. The user therefore does not need to remember the theoretical weight—the end point of the dosing is always the 100% point of analogy display 6 and 0.0 g of digital display 10. This end point of the dosing is shown in FIGS. 1 and 2. The user then tares the first component by pressing the tare key, counter 24 jumps to "2", the corresponding light-emitting diode 16 lights up, the user puts in the theoretical weight of the second component, etc.

Of course, counter 25 can also be advanced by another key of command keyboard 14. In the example of the last paragraph it could be the "SO" key for inputting the theoretical value. When finished packages are being checked, it could be the "EN" key for inputting the measured value into the statistical arithmetic register.

The invention is of course not limited to balances with a raised display/operating console, but can also be used in balances with a display/operating field directly in front of the weighing dish.

The other light sources 15 can of course be associated with existing keys of command keyboard 14, e.g. with the left column in FIGS. 1 and 2. In this instance the light sources are located in the corners of these keys and only the associated designation "10", "20", "30" and "40" would be next to the keys.

We claim:

1. Electronic balance having a measured value receiver, a digital signal processing unit, a digital display, a tare key, a 10-key keyboard for inputting data and commands, and having a counter inside the digital signal processing unit which is advanced by one each time the tare key is actuated, characterized in that a light source (16) is associated with each of at least a few keys of the 10-key keyboard (12) and that the counter (24) located in the digital signal processing unit (20) actuates the light source of the 10-key keyboard corresponding to its counter reading.

2. Electronic balance according to claim 1, characterized in that the light sources (16) are formed by light-emitting diodes.

3. Electronic balance according to claim 2 characterized in that the light source (16) is located in a corner of the particular key.

4. Electronic balance according to claim 2, characterized in that other light sources (15) are present in the vicinity of the 10-key keyboard which represent additional decades of the counter reading.

5. Electronic balance according to claim 1 characterized in that the light source (16) is located in a corner of the particular key.

6. Electronic balance according to claim 5, characterized in that other light sources (15) are present in the vicinity of the 10-key keyboard which represent additional decades of the counter reading.

7. Electronic balance according to claim 1, characterized in that other light sources (15) are present in the vicinity of the 10-key keyboard which represent additional decades of the counter reading.

* * * * *